May 25, 1926.
C. W. PARKER
VINEYARD BRUSH RAKE
Filed Nov. 24, 1924    2 Sheets-Sheet 1
1,585,870
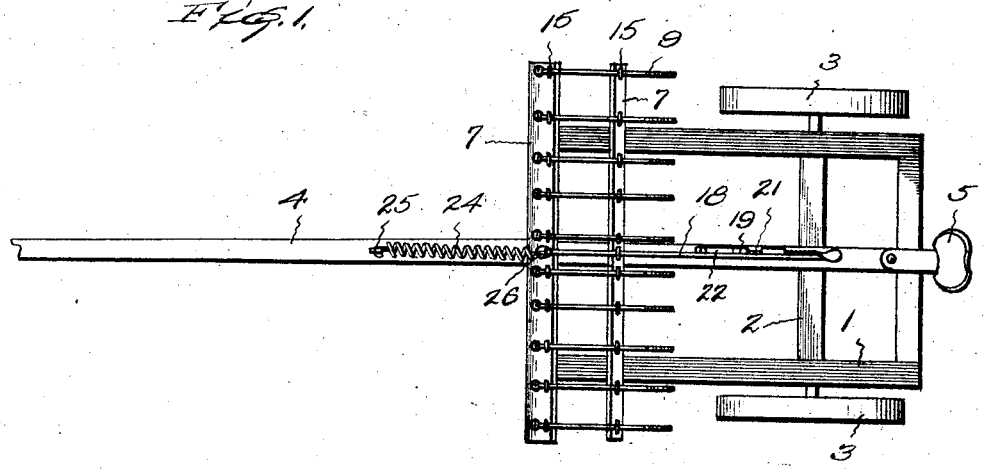
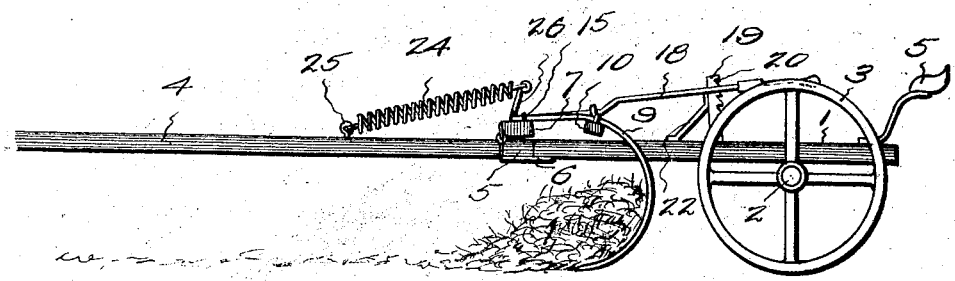
Inventor
C. W. PARKER
By Richard B. Owen,
Attorney
Witness May 25, 1926.
C. W. PARKER
VINEYARD BRUSH RAKE
Filed Nov. 24, 1924    2 Sheets-Sheet 2
1,585,870
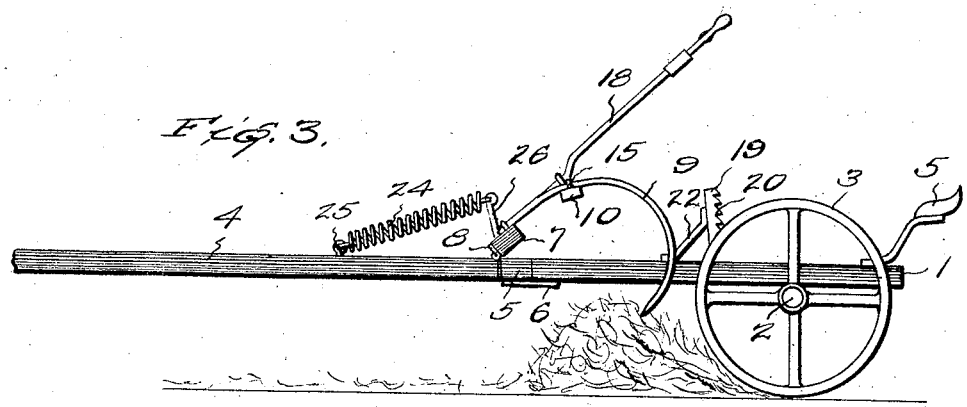
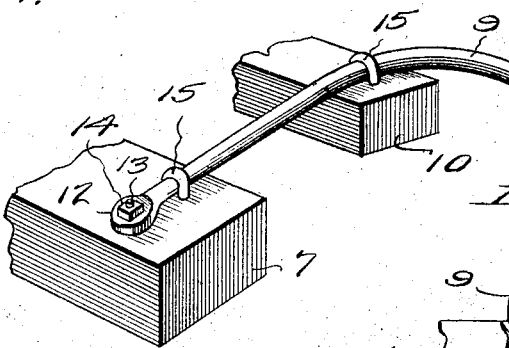
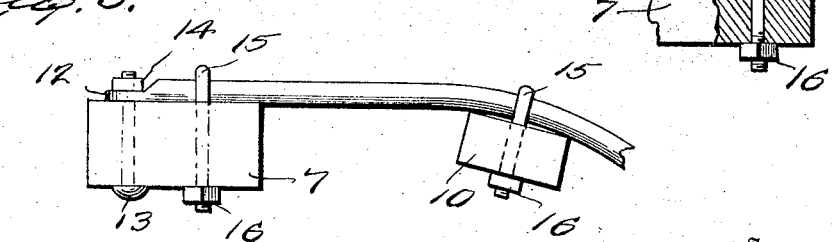
Inventor
C. W. PARKER
Witness
By Richard B. Owen,
Attorney Patented May 25, 1926.

1,585,870

UNITED STATES PATENT OFFICE.

CLARENCE W. PARKER, OF YOUNTVILLE, CALIFORNIA.

VINEYARD-BRUSH RAKE.

Application filed November 24, 1924. Serial No. 752,041.

The present invention appertains to a vineyard brush rake and has for its principal object to provide a very efficient and effective structure which is easy to manipulate, one which is reliable under all circumstances and well adapted to the purpose for which it is designed.

Another specific object of the invention is to provide a structure wherein the rake is disposed in front of the driver in order that he may watch the same at all times and manipulate it in the proper manner thus preventing harm to the vineyards.

Another important specific object of the invention is to provide a structure wherein the rake is disposed in front of the wheels of the frame so that the brush is not trampled down by the wheels before the rake engages the same.

Another still further important specific object of the invention is to provide a structure wherein the rake is disposed before the wheels and the driver's seat behind the wheels so as to properly balance the frame thus taking any undesirable weight off of the draft animals and allowing them to manipulate the device in an easy manner with the least possible effort.

Another very important object of the invention is to provide a structure of this nature wherein the rake is normally held in a raised inoperative position by means of a spring and may be readily depressed to an operative position by the driver, means being provided so that it may be held in an adjusted operative position.

With the above and numerous other objects in view as will appear as the description proceeds, the invention resides in certain novel features of construction, and in the combination and arrangement of parts as will be hereinafter more fully described and claimed.

In the drawing:

Figure 1 is a plan view of the vineyard brush rake embodying the features of my invention, Figure 2 is a side elevation thereof showing the rake in an operative position, Figure 3 is another side elevation thereof showing the rake in an inoperative position, Figure 4 is a detail view showing the manner in which one of the tines of the rake is mounted, Figure 5 is a side elevation of the section shown in Figure 4, and Figure 6 is a detail view partly in section showing the fastening device for holding a tine of the rake.

Referring to the drawing in detail it will be seen that a U-shaped frame 1 is provided with the transversely extending axle beam 2 attached thereto and extended therebeyond so as to be supported by suitable wheels 3 which are thus disposed intermediate of the frame. A tongue 4 extends longitudinally of the frame centrally between the sides thereof being attached to the rear or intermediate portion of the frame and extending well beyond the ends thereof. A seat 5 is attached to the rear end of this tongue and extends beyond the rear of the frame 1. Any desirable means may be attached to the tongue in order that draft animals may be hooked up thereto. A cross bar 5 is attached to the forward ends of the frame 1 by means of plates 6 or in any other suitable manner and a bar 7 is hinged thereto. This hinged bar has its forward edges fixed to the upper leaves of hinges 8 while the lower leaves thereof are fixed to the forward edge of bar 5.

The bar 7 forms a part of the rake which includes also a plurality of curved tines or teeth 9 braced and held in spaced relation to each other intermediate their ends by a brace bar 10. The ends of the tines 9 adjacent the hinged bar 7 are flattened as at 12 and provided with openings for receiving bolts 13 which pierce the bar 7 and nuts 14 form the tines engaged therewith and also with the bar 7. U-shaped or hooked bolts 15 are formed with a long leg that pierces the bars 7 and 10 and engages the tines as is clearly shown in Figure 6 and nuts 16 hold these bolts in place.

An elongated handle or operating member 18 is fixed at one end to the bar 7 and intermediate its ends to the bar 10 and extends rearwardly toward the driver's seat 5 in order that the driver may raise or lower the rake. A rack 19 rises from the tongue and has suitable teeth on one edge as at 20 for engagement by a spring pressed pawl 21 carried on the handle 18. This rack is preferably braced as at 22. A spring 24 has one end fixed to a forward portion of the tongue 4 as at 25 and its other end is fixed to the end of an arm 26 attached to the hinged bar.

This spring 24 is tensioned so as to normally swing the bar 7 away from the bar 5 that is so as to normally hold the rake in a raised position as is shown in Figure 3. When in this position the driver may grasp the handle 18 swinging the same downwardly so as to engage the teeth 20 and thus hold the rake in any adjusted desired position in relation to the ground.

It is apparent from the above that I have devised a very simple and efficient as well as novel structure of a vineyard brush rake which embodies all the features of advantage enumerated as desirable in the statement of the invention and in the above description. The device is capable of being very easily manipulated and the driver can keep his attention constantly on the rake during the operation thereof and may very readily manipulate the same to the proper or desired position during its operation. It will furthermore be noted that because of the location of the rake forwardly of the wheel and the driver's seat rearwardly thereof that there is practically no weight on the draft animals and thus they may very easily guide the apparatus thus allowing a great efficiency on the part of the operator in both driving and manipulating the rake.

The present embodiment of the invention has been disclosed in detail by way of example and disclose the preferred construction of the apparatus. It is evident, however, that numerous changes in the details of construction, and in the combination and arrangement of parts may be resorted to without departing from the spirit or scope of the invention as hereinafter claimed or sacrificing any of its advantages.

Having thus described my invention, what I claim as new is:

1. The combination with a wheeled frame including parallel side bars, a tongue projecting forwardly from the frame, a cross bar hinged to the frame and extending transversely of the same, a plurality of arcuate tines carried by the cross bar, a rigid brace bar extending parallel to the cross bar and to which the tines are connected, a contractile spring having one end connected to the cross bar and its opposite end connected to the tongue and normally urging the cross bar in a direction to hold the tines in an elevated position, a rack bar arranged on the frame rearwardly of the tines, a lever carried by the cross bar whereby to move the latter in a direction to engage the tines with the ground, and a detent carried by the lever for engagement with the rack bar to hold the tines in operative position, the side bars being disposed in the path of movement of the cross bar and being adapted to be engaged by the latter whereby to limit the lowering movement of the tines and to prevent the spring from being distorted.

2. The combination of a wheeled frame including substantially parallel side bars, a tongue projecting forwardly from the frame, a cross bar hinged to the top of the frame and extending transversely thereof, a plurality of tines carried by the cross bar, a rigid brace bar extending parallel to the cross bar and to which the tines are connected intermediate their ends, spring means carried by the frame and engaging the cross bar for normally urging the same in a direction to hold the tines in an elevated position, a lever carried by the cross bar and secured to the rigid brace bar intermediate its ends, and means for retaining the tines in lowered position against the action of said spring means, the said side bars being disposed in the path of movement of the cross bar and adapted to be engaged by the latter whereby to limit the lowering movement of the tines and to prevent the spring means from being distorted.

3. The combination with a wheeled frame including substantially parallel side bars and a tongue projecting forwardly from the frame intermediate the said side bars, of a cross bar having its front side hinged to the frame and extending transversely thereof, a plurality of tines carried by the cross bar, a rigid brace bar extending parallel to the cross bar and to which the tines are connected, a contractile spring having one end connected to the cross bar and its opposite end connected to the tongue and normally urging the cross bar in a direction to hold the tines in an elevated position, and means for lowering the said tines against the action of the spring, the said side bars being disposed in the path of movement of the cross bar and adapted to be engaged by the latter whereby to limit the lowering movement of the tines and to prevent the spring from being distorted.

In testimony whereof I affix my signature.

CLARENCE W. PARKER.